No. 728,311. PATENTED MAY 19, 1903.
H. M. SINGER.
BALL.
APPLICATION FILED FEB. 3, 1903.
NO MODEL.
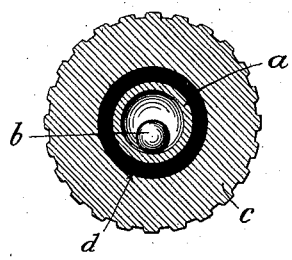
WITNESSES:
M. J. Dixon
Jno. D. Bloss
INVENTOR:
Herbert Montague Singer,
By Henry H. Bates,
Attorney.

No. 728,311. Patented May 19, 1903.

UNITED STATES PATENT OFFICE.

HERBERT MONTAGUE SINGER, OF DEREHAM, ENGLAND.

BALL.

SPECIFICATION forming part of Letters Patent No. 728,311, dated May 19, 1903.

Application filed February 3, 1903. Serial No. 141,630. (No model.)

*To all whom it may concern:*

Be it known that I, HERBERT MONTAGUE SINGER, steward, a subject of the King of Great Britain, residing at Elmham Hall, Dereham, in the county of Norfolk, England, have invented an Improved Ball for Golf or other Similar Games, of which the following is a specification.

The object of the present invention is to so construct balls for golf and other similar games that they will run longer or travel farther both through the air or along the green or ground than balls of ordinary or known construction will do, while they will run truer and constitute reliable putting-balls.

The invention consists, broadly, in an outer gutta-percha covering or ball proper, hollow in the center, having one or more balls within the central space (the latter being of such size as will enable the balls to revolve and run or move freely within such space) and an interposed layer of india-rubber or other elastic material between said outer gutta-percha body and the central inclosure containing the ball or balls.

A suitable method of carrying my invention into effect is illustrated in section in the accompanying drawing.

In carrying out my invention I employ a hollow inclosure or globe $a$, within which a smaller solid ball or balls $b$ is or are introduced, the hollow space in the interior of the globe $a$ being of sufficient size to enable such ball or balls $b$ to move freely within same. The globe $a$ may consist of any suitable material—such as metal, celluloid, xylonite, or other similar substance or composition—and may either be formed around the solid ball or balls $b$ or made in sections capable of being screwed, welded, or otherwise secured together after the introduction of said ball or balls therein. Such ball or balls $b$ may be of metal or other suitable material which is not liable to break easily—such as bone, ivory, or a sufficiently hard composition—it being essential that the material employed should not be so heavy as to increase the weight of the whole ball to any considerable extent.

When the globe $a$ containing the solid ball or balls $b$ has been completed, it is surrounded with a layer $d$ of india-rubber or other suitable elastic material, which may be wound, molded, or otherwise formed around such globe and be of the thickness found best to impart the desired elasticity or "life" to the ball, while enabling the same to be covered with some comparatively rigid material $c$ (such as gutta-percha) capable of resisting the impact of the blows from the golfing-clubs employed to propel them.

As above stated, if desired more than one solid ball $b$ may be introduced into globe $a$.

After the layer of suitable elastic material $d$ has been placed around the exterior of the globe $a$, inclosing the interior space containing the solid ball or balls $b$, the whole is covered with a layer of gutta-percha or other relatively hard material $c$ (either by molding or otherwise) of a thickness to bring the diameter of the finished ball to the regulation or other desired size.

The exterior of the complete ball may have a roughened or interrupted surface formed thereon in any suitable manner, the raised and depressed surfaces being of any desired contour, but it is preferred to form such exterior surface with a series of concentric circles composed of undulating or wave-like lines, which may either be uninterrupted all around the ball or may be intersected by cross bars or lines arranged at right angles to each other and in the direction of the center from which the wave-like lines are struck.

The relative sizes and weights of the hollow globe $a$ and the interior solid ball or balls $b$ with regard to each other and to the exterior layer or covering $c$ of gutta-percha or other material and the interposed elastic layer $d$ may be varied to suit different requirements, such as those dictated by individual taste or fancy or by the nature of the ground and the conditions under which the ball is to be employed.

What I claim as my invention, and desire to secure by Letters Patent, is—

The improved ball, consisting of an outer layer, an inner concentric layer of relatively higher elasticity than the outer layer, a hollow globe centrally located within said inner layer, and a solid element free to move within said central globe.

In testimony whereof I have signed my name to this specification in the presence of two subscribing witnesses.

HERBERT MONTAGUE SINGER.

Witnesses:
WM. B. BROWN,
R. J. LANG.